United States Patent [19]
Galves et al.

[11] 4,342,821
[45] Aug. 3, 1982

[54] DIRECTIONAL FILTER FOR A DISPLAY SCREEN, THE METHOD FOR MANUFACTURING SAME AND A DISPLAY SYSTEM, A CATHODE-RAY TUBE IN PARTICULAR, PROVIDED WITH SUCH A FILTER

[75] Inventors: Jean P. Galves; Pierre Merloz; Jean Sagnard, all of Paris, France

[73] Assignee: Thompson-CSF, Paris, France

[21] Appl. No.: 170,278

[22] Filed: Jul. 18, 1980

[30] Foreign Application Priority Data

Jul. 27, 1979 [FR] France ................. 79 19429

[51] Int. Cl.³ .............. G03C 5/00; G02B 27/00; G02B 5/20
[52] U.S. Cl. ........................... 430/12; 430/23; 430/28; 430/29; 430/27; 430/25; 430/321; 430/324; 430/950; 350/311; 350/276 SL
[58] Field of Search ................ 430/6, 4, 23, 290, 321, 430/323, 950, 324, 24, 27, 12; 156/644, 663; 427/162, 163, 165, 166, 244, 294; 296/97 R, 97 F; 350/311, 96.27, 276 SL, 277, 276 R, 322

[56] References Cited

U.S. PATENT DOCUMENTS

| | | | |
|---|---|---|---|
| 3,020,433 | 2/1962 | Day ................................. | 156/663 X |
| 3,295,968 | 1/1967 | Hamilton ........................ | 430/321 X |
| 3,378,636 | 4/1968 | Hamilton ........................ | 350/276 R |
| 3,447,984 | 6/1969 | Castrucci et al. .............. | 156/644 X |
| 3,458,370 | 7/1969 | Cone ................................ | 156/644 X |
| 3,582,189 | 6/1971 | Moritz et al. .................. | 350/276 R |
| 3,760,215 | 9/1973 | Sach ................................ | 350/276 R |
| 3,907,403 | 9/1975 | Maeda ............................ | 350/96.27 |

*Primary Examiner*—Richard L. Schilling
*Attorney, Agent, or Firm*—Roland Plottel

[57] ABSTRACT

For improving the contrast of information displayed on the screen, there is placed in front of this latter a filter comprising a matrix of channels pierced in a photosensitive glass plate. The pierced plate is covered over the whole of its surface with a blackened deposit so as to reduce to the maximum its coefficient of reflection. Thus filters can be formed readily on request, according to the direction of observation in particular, with a good coefficient of transmission and improved contrast.

6 Claims, 5 Drawing Figures

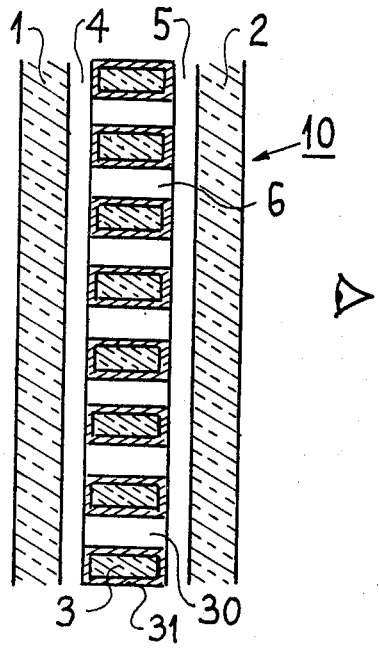
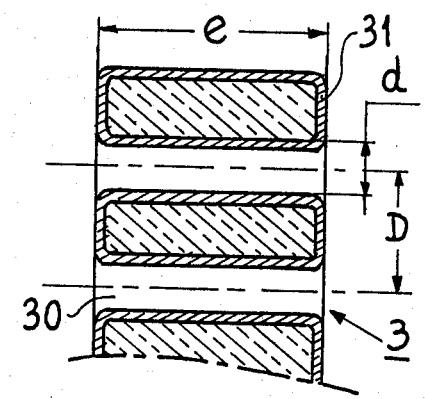
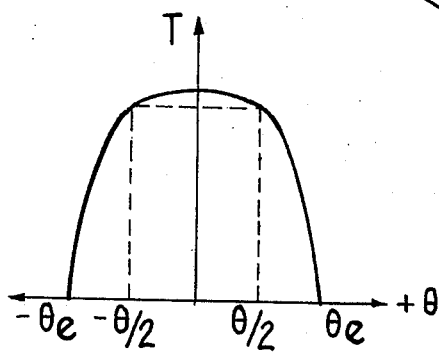
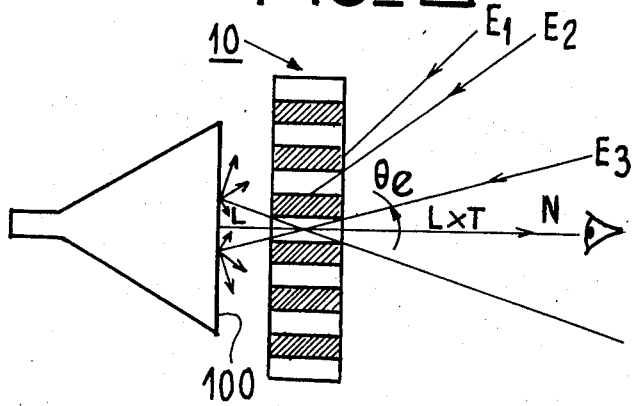
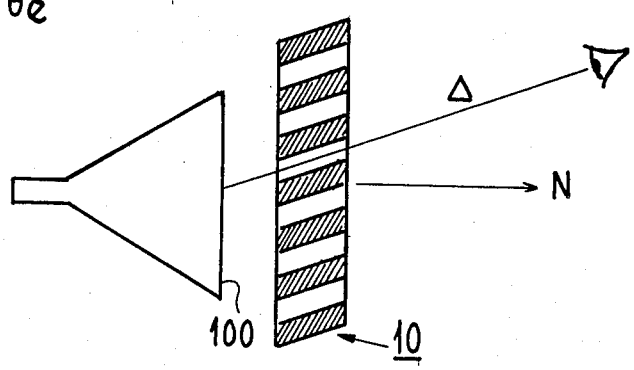

DIRECTIONAL FILTER FOR A DISPLAY SCREEN, THE METHOD FOR MANUFACTURING SAME AND A DISPLAY SYSTEM, A CATHODE-RAY TUBE IN PARTICULAR, PROVIDED WITH SUCH A FILTER

BACKGROUND OF THE INVENTION

The invention relates to a directional filter for luminescent screen used for displaying information. It relates more generally to any information display system using one or more of these screens.

The observation of luminescent screens—cathode-ray tubes (TRC) for example—and the information displayed thereon may be rendered difficult by the lighting of the surroundings: surrounding lighting which is too intense impairs the proper reading of the luminous traces appearing on the screens; this is the case particularly in the cockpit of aircraft lit up by the sun or by the light diffused from the clouds. The part of the surrounding light reflected by the screen is superimposed on the luminous trace to be read and impairs suitable reading of the information. The contrast with which this trace appears is insufficient to enable it to be properly perceived. The difficulty remains practically the same with polychrome screens, presenting traces of several different colors.

Different solutions to this difficulty have been practised:

that of the neutral filter in particular. A filtering element having a certain transmission coefficient T is placed in front of the screen; the coefficient T is the fraction of the transmitted light corresponding to a given incident light, whatever the direction in which it reaches the filter.

The part of the surrounding light reflected by the screen undergoes twice the reduction by the coefficient T before reaching the eye of the observer, once to reach the screen, and a second time when it is reflected thereby. It is then attenuated in the ratio $T^2$, whereas on the contrary the light coming from the trace to be observed only undergoes this reduction once. The contrast is then improved in the proportion of 1/T. If T=10%, it can be seen that this improvement is that of a factor 10, and that of so-called selective or passband filters absorbing the whole of the visible light with the exception of the light of the trace.

Another type of solution to this difficulty consists in directional filters, valid not only for traces of several colors but also for all traces of the same color.

A directional filter is an optical system whose transmission depends on the angle of incidence. It is generally formed from a flat plate having a multitude of holes of small diameter bored therein. An indicatrix, or curve giving the transmission coefficient with respect to this angle is made to correspond therewith; this curve presents a maximum in the sighting axis and values which progressively decrease away from this axis, to become practically zero beyond a certain value of the angle, called angle of extinction, i.e. outside a so-called extinction cone.

The axial transmission coefficient of such filters may reach several tenths and the reflection coefficient 0.3% only outside the extinction cone.

The invention relates to one of these directional filters.

But, whereas in the prior art these filters were generally constructed by stacking plates, for example photographic negatives having a honeycomb pattern thereon, metal plates having circular holes bored therethrough in a given arrangement—the invention provides, on the contrary, for this filter to be formed from a single plate or a matrix enclosed between supports under conditions which will be set forth.

In general, the superimposed-plate solutions give in fact too high a coefficient of reflection, in the case of photo negatives in particular; because of the dimensions of the openings made, they also give too large an angle of extinction.

The filter of the invention must allow observation in luminous surroundings with lighting going up to 100,000 lux.

SUMMARY OF THE INVENTION

For this, the invention uses a photosensitive glass. Such a glass when it is exposed to ultraviolet light through a mask, begins by changing color at the places exposed; these parts may then be dissolved by chemical etching. This property of the material allows the formation in the plate thus exposed of extremely accurate patterns and the piercing therein, by said chemical etching, on condition that it is sufficiently extended, of networks of channels having a very small diameter passing through the plate from one side to the other. The invention takes advantage of this property for providing directional filters usable in the luminous surroundings which have been mentioned. The chemical etching enables channels of very small diameter to be pierced with considerable heights, i.e. plate thicknesses; examples will show it further on. There is generally observed a narrowing of the section of the channels at mid-height, for etching carried out from both faces.

Furthermore, once the piercing is finished, the same material lends itself well to coating the whole surface cut out with a metal, deposited by chemical means for example, then to the blackening thereof by different means.

DESCRIPTION OF THE DRAWINGS

The invention will be better understood with reference to the following description and the accompanying figures which show:

FIG. 1: A schematical sectional view showing the different parts forming the filter of the invention.

FIG. 2: An enlarged view of a detail of FIG. 1.

FIG. 3: A view of the same filter illustrating its operation.

FIG. 4: A diagram relative to the filter of the invention.

FIG. 5: A view similar to that of FIG. 3 for another variation of the filter of the invention.

DESCRIPTION OF THE PREFERRED EMBODIMENTS

FIG. 1 is a sectional view showing the different consecutive parts of a filter of the invention; the whole of the filter is designated by the reference 10.

Filter 10 is formed from three superimposed pieces of glass bonded to one another by means of a resin.

Piece 1, situated on the side of the observer, is a sheet of ordinary glass, transparent to visible radiation; it is preferentially satined on the outside, by chemical etching, to ensure the diffusion of a fraction of the surrounding light which it reflects. The satining is limited because of the need to have substantially no loss of resolution, also by diffusion, with respect to the images given by the screen. Piece 1 is coated, preferentially also, on its satined face with an anti-reflecting layer.

Piece 2, situated on the screen side, is a piece similar to piece 1, but without satining or anti-reflecting layer.

Between the two, there is disposed a plate 3 forming the filter properly speaking. This plate is made from photosensitive glass, for example Fotoform glass, a registered trademark of Corning Glass. It has channels 30, cylindrical in shape for example, emerging perpendicularly to the faces of this plate. These channels are shown enlarged in FIG. 2. Channel a has a diameter d which may be about 100 micrometers for a plate thickness e of the order of a millimeter; the distance between the axes of two adjacent channels is about 150 micrometers. The channels are disposed along a matrix of lines and columns occupying the greatest part of plate 3, for example square 150×150 mm. Channels 30 as well as plate 3 itself are coated with a black coating 31, preventing light reflections, as shown in the drawing. The three pieces 1, 2 and 3 are bonded together by two layers of resin 4 and 5 transparent to the light emitted by the light traces, i.e. from the screen; the resin is also transparent therefore to the surrounding light although this condition is not sought for improving the contrast.

Plates 1 and 2, or slabs which play the role of supports, are relatively thick; they may reach 2 to 2.5 millimeters, whereas on the contrary the very thin layers of bonding material 4 and 5 scarcely exceed a few hundredths of a millimeter in thickness; this bonding material fills the channels 30 along small cylinders 6 connecting layers 4 and 5. With the preceding figures, it can be seen in the figure the proportions of the different elements have not been respected; they have not been respected either in the other figures; furthermore in some, the solid parts between the channels have been, for the sake of simplicity, completely covered with hatching, as if they were entirely made of the metal which covers them.

The directional type filter of the invention operates in the way which will be explained with reference to FIG. 3.

Filter 10 is placed between the screen 100 and the eye of the observer. For an axial transmission coefficient T (direction of the arrow N) the observer sees through the filter a light signal of luminance L with a luminance L×T. It is assumed that the ambient lighting is a diffuse and homogenous lighting E. A part $E_1$ thereof is stopped by the filter and reflected thereby with a very low coefficient R of reflection; it is in fact almost entirely absorbed by the blackened plate 3. Another part penetrates into channels 30; depending on its direction it also is absorbed by the walls of the channels (fraction $E_2$ in the figure), or transmitted to the screen (fraction $E_3$), by which it is reflected in a diffuse manner (small arrows) inside the angle $\theta$ of extinction, with a coefficient of transmission equal to the same coefficient T. The result is that the bottom of the screen presents, because of the diffuse lighting from the surroundings, low luminance and a good contrast for the luminous trace or traces to be read.

The eye of the observer receives in fact, because of the diffuse lighting of the surroundings, the part of the light reflected by the filter corresponding, according to what has been said, with lighting $RE_1$, to which is added the preceding part resulting from diffusion by the screen, which part, because of the double transmission, cannot itself be very much greater than $RE_1$.

Furthermore, insofar as the reflection by the filter is concerned, it will be noted that it is further attenuated because of the presence of the observer, never very far from the screen, whose head may form an efficient mask for the incident light from the surroundings and produces screening thereof in all or part of the extinction cone; however it may be, all these reflections, for the ambient light, correspond to a total coefficient of reflection which will be designated by $R_t$. This coefficient is of the order of a few thousandths for the filters of the invention, whereas for the same filters the coefficient of transmission T is located at about several tenths; this results in an improvement of contrast, measured by the factor $T/R_t$, which may be several times 10.

Two examples of structures and characteristics of the filter of the invention, with cylindrical channels perpendicular to the faces of the filter disposed along a matrix of lines and columns intersecting at 60°, are given herebelow:

|  | I | II |
| --- | --- | --- |
| diameter of the channels: |  |  |
| at the center | 110 μm | 100 μm |
| at the ends | 150 μm | 150 μm |
| distance between axes | 170 μm | 170 μm |
| thickness of the plate (3) | 0.6 mm | 1.2 mm |
| angle of extinction $\theta_e$ | 20° | 10° |
| coefficient of axial transmission T | 0.42 | 0.30 |
| coefficient of reflection R | 0.25% | 0.25% |
| coefficient of reflection $R_t$ with axial shielding of 10° | 0.7% | 0.25% |
| Ratio $\dfrac{T}{R_t}$ | 60 | 120 |

The examples are relative to filters whose channels are substantially straight cylinders with a circular section and directed perpendicularly to the faces of plate 3, for observation in the direction perpendicular thereto. It will moreover be noted, in these examples, that these cylinders are a little bell-shaped at their ends. This diabolo form is favorable to a small variation of the preceding coefficient of transmission T with the angle of observation. In the middle of the extinction cone, i.e. for an observation angle $\theta$ equal to $\theta_e/2$, we still have, as shows the diagram of the transmission indicatrix of FIG. 4, for the channels of example 1, a coefficient of transmission equal to 0.9T; it would only be 0.5T with strictly cylindrical channels.

The same channels 30 may also be provided sloping with respect to the faces of plate 3, for airborne equipment, for example, in which the pilot from his seat sees the screen obliquely. Thus the coefficient of transmission towards this latter is improved. FIG. 5 gives a schematical view of this case, for a direction of observation Δ.

Finally, other forms of channels may be practised, for example channels with an elliptical cross-section, having, different transmission coefficients in two perpendicular planes.

This form of channel is advantageously used when the information is intended for two observers occupying different seats, for example the pilot and co-pilot in the cabin of an aircraft.

The preparation of the filters of the invention requires, as has already been said, a photosensitive glass plate which has been pierced with a system of channels by exposure to ultraviolet rays through a mask, then etching by a chemical agent; examples of channels have been given whose section presents a smaller surface at the center of the glass plate.

This plate is then covered over the whole of the cut-out surface, including the inside of the channels, with a metal deposit 31, FIG. 2, of small thickness. The metal chosen is advantageously chromium, for its adherence to the glass of plate 3. Another metal used is copper. In both cases, the coating may be obtained by evaporation in a vacuum; for copper the deposit may also be effected chemically.

Finally, depositing the two metals is also advantageously practised, for the adherence mentioned and for facilitating the following operation. This consists in blackening the deposit thus obtained; in the case of copper it takes place simply by a chemical process, by steeping in a bath of sodium polysulphide for five minutes for example.

The matrix of channels thus prepared is placed on a glass plate (1 or 2 in the drawings) previously abundantly coated with a bonding agent transparent to the light of the traces, a silicone resin for example, chosen so as to present an index of refraction as close as possible to that of glass plates 1 and 2 which it bonds to matrix 3, so as to avoid specular reflections at the interfaces with these plates. Resin RTV 141 A manufactured by Rhone-Poulenc is suitable in this respect. The second plate is applied when the resin has overflowed from the other face of the matrix.

Finally, it will be noted that the metal with which the channels and the faces of the plate are covered, connected to ground, functions as a screen with respect to all the alternating electrical components existing in the observation system or in its environment, scanning components in particular. The filter of the invention thus supplies, by its very construction, a solution to the problem of eliminating parasites without any additional arrangement. This is one of its advantages.

There has been described above a number of variations of the filter of the invention, particularly insofar as the shape of its channels is concerned. It goes without saying that all variations resulting from the combination of those described, or accessible therefrom to the man skilled in the art are also included in the invention.

The invention finds one of its applications in the use of display equipment of all kinds operating in high-luminance environments, airborne equipment for the piloting cabins of aircraft in particular. It concerns, besides the filter itself, the equipment on which it is mounted, cathode-ray tubes in particular.

What is claimed is:

1. A method of manufacturing a directional filter for display screen comprising, in succession, the following steps:

taking a plate of a photo-sensitive glass;

exposing said plate to ultraviolet light through a mask whose meshes are arranged in a given pattern;

etching the plate by action of a chemical agent whereby obtaining a network of channels passing through the plate at the location of said meshes;

depositing over the whole of the surface of the plate, including the inside of the channels, a thin metallic layer;

blackening the deposit thus obtained, to form a plate with network of open, light transmitting channels.

2. The method as claimed in claim 1, wherein said metallic layer is made of chromium.

3. The method as claimed in claim 1, wherein said metallic layer consists in a first deposit of chromium then coated with copper, and wherein said blackening is carried out by steeping the plate in a sodium polysulphide bath.

4. The method as claimed in claim 1, further comprising, in succession, the following steps:

placing the plate on a first slab transparent to visible radiation, which slab is previously coated with a bonding agent transparent to the light issuing from the screen and whose index of refraction is close to that of the slab;

applying on the opposite face of the plate a second slab similar to the former after the bonding agent has been allowed to overflow through the channels.

5. The method as claimed in claim 4, wherein said bonding agent is a silicone resin.

6. A directional filter for display screen prepared according to the method as claimed in claims 1 or 4.

* * * * *